United States Patent
Sevigny

(10) Patent No.: US 10,338,902 B1
(45) Date of Patent: Jul. 2, 2019

(54) METHOD AND SYSTEM FOR A COMPILER AND DECOMPILER

(71) Applicant: Unity IPR ApS, Copenhagen K (DK)

(72) Inventor: Benoit Sevigny, Montréal (CA)

(73) Assignee: Unity IPR ApS, Copenhagen K (DK)

( * ) Notice: Subject to any disclaimer, the term of this patent is extended or adjusted under 35 U.S.C. 154(b) by 0 days.

(21) Appl. No.: 16/019,524

(22) Filed: Jun. 26, 2018

Related U.S. Application Data

(60) Provisional application No. 62/525,101, filed on Jun. 26, 2017.

(51) Int. Cl.
*G06F 9/44* (2018.01)
*G06F 8/41* (2018.01)

(52) U.S. Cl.
CPC ............ *G06F 8/4435* (2013.01); *G06F 8/433* (2013.01); *G06F 8/436* (2013.01)

(58) Field of Classification Search
None
See application file for complete search history.

(56) References Cited

U.S. PATENT DOCUMENTS

| | | | | |
|---|---|---|---|---|
| 2009/0172650 A1* | 7/2009 | Spurlin | ................. | G06F 8/53 717/144 |
| 2011/0321018 A1* | 12/2011 | Tatsubori | ............... | G06F 8/53 717/137 |
| 2013/0246370 A1* | 9/2013 | Bartram | ............ | G06F 21/577 707/692 |
| 2014/0019718 A1* | 1/2014 | Kuo | ................... | G06F 9/30018 712/200 |
| 2014/0137088 A1* | 5/2014 | Mitchell | ................ | G06F 8/53 717/143 |
| 2015/0106795 A1* | 4/2015 | Rioux | .................. | G06F 8/427 717/143 |
| 2016/0117157 A1* | 4/2016 | Stadler | .................... | G06F 8/53 717/151 |
| 2017/0068610 A1* | 3/2017 | Gschwind | .......... | G06F 11/3664 |

(Continued)

OTHER PUBLICATIONS

Brecka, "A Decompiler for Objective-C," 2016, (Year: 2016).*

(Continued)

*Primary Examiner* — Insun Kang
(74) *Attorney, Agent, or Firm* — Schwegman Lundberg & Woessner, P.A.

(57) ABSTRACT

A method, system, and computer-readable medium including operations for optimizing computer code is disclosed. A block of mixed intermediate representation (MIR) code is received. A partially-decompiled block of computer code is generated from the MIR code. For each instruction in the block of MIR code, in reverse order, a native expression vector for the instruction is computed. A set of pattern-matching operations is repeated until no transformations occur. A fully-decompiled block of computer code is generated from the partially-decompiled block of computer code, the fully-decompiled block of computer code having a semantic level that is raised. The fully-decompiled block of computer code is provided for deployment on an architecture, the deployment including lowering the semantic of the computer code to a level that corresponds to a CPU or GPU supported by the architecture.

20 Claims, 6 Drawing Sheets

(56) References Cited

U.S. PATENT DOCUMENTS

2018/0068121 A1* 3/2018 Gray .................... G06F 8/74
2018/0157471 A1* 6/2018 Venkataramani ....... G06F 8/445

OTHER PUBLICATIONS

Naeem et al., Programmer-friendly Decompiled Java, © 2006 IEEE (Year: 2006).*

Araujo et al., "Interprocedural Variable Liveness Analysis for Function Signature Recovery," Carnegie Mellon Univ (Year: 2014).*

* cited by examiner

METHOD AND SYSTEM FOR A COMPILER AND DECOMPILER

CROSS-REFERENCE TO RELATED APPLICATIONS

This application claims the benefit of U.S. Provisional Application No. 62/525,101, filed Jun. 26, 2017, which is incorporated by reference herein in its entirety.

TECHNICAL FIELD

The present disclosure relates to the field of software tools for use in compiling and decompiling computer code.

BACKGROUND

Various tools exist to allow the compilation and decompilation of software code. A compiler is a software tool that translates (and optionally optimizes) high level languages into low-level instruction sequences that hardware can understand and execute (e.g. an executable file). Compilers are needed by anybody who develops software running on central processing units (CPUs) or graphical processing units (GPUs). These include for example languages such as C# and C++ that run on CPUs as well as other languages such as HLSL, GLSL, and Compute Shaders that run on GPUs. A decompiler does the opposite and is a software tool for taking an executable computer program file and translating it into a computer language source file at a high level. Sometimes the translation is not perfect and the decompiled file is not equivalent to source file that was originally compiled to create the executable file. Decompilers are used to reverse engineer computer programs.

In the world of computer graphics, most computer graphics applications use vectors when performing calculations. Modern processors deal natively with vectors using SIMD, or Single Instruction Multiple Data methodology. This allows a processor, for example, to add two colors as a vector in one operation rather than using the inefficient method of having 4 addition operations (e.g., one addition for each component, including red, green, blue and alpha). This is due in part to the convenient fact that 3D coordinates are naturally in vector format (e.g., x, y, z) and any color can also be thought of as a vector combination of basic colors such as Red (R), Green (G), and Blue (B) with vector formatting (e.g., R, G, B, alpha). SIMD is included in most modern day compilers, however, existing compilers see vectors as an opaque data structure (e.g., the compilers are blind to the components of the vector). Or sometimes the compiler can 'see' a value for the vector if all the components of the vector have the same value (making a vector more similar to a scalar value). The opaque nature of the data structure makes optimization by the compiler impossible in some situations since some operations on vectors will only affect a single component and the compiler would not be able to see the modification.

In addition to the values of a vector being opaque to existing compilers, library calls that include mathematical functions (e.g., including square root, sine, cosine, rounding functions, and the like) are also opaque and considered black boxes since a user can link to any library to return a mathematical function. When a function or value is opaque, a compiler cannot assume anything about the function and is limited with the optimizations it can perform. For example, existing compilers have no way of knowing about higher level math such as dot products and cross products, nor do they know about high level math identities such as Lagrange's identity. Existing compilers also have no information on the properties of math functions or how those properties can be used for optimization, for example an existing compiler does not know that the cosine function is symmetric around zero and that the symmetry can be useful in optimization. A compiler would see a cosine function call as a black box function call with no semantic information to use for optimization (e.g., optimizations including the application of trigonometric identities to simplify mathematical expressions).

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The description that follows describes systems, methods, techniques, instruction sequences, and computing machine program products that constitute illustrative embodiments of the disclosure, and are not to be construed as limiting the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

There is described herein a method and system for a vector based compiler and decompiler that can accept and compute vector inputs, wherein the method and system internally uses vector calculations so that the compilation and decompilation occur rapidly. The compiler/decompiler described herein is capable of seeing vector components up to a size of 16 components and it has an efficient data structure to deal with the large vectors and which allows the compiler to perform optimization on the vectors as well. One advantage of using the described compiler/decompiler is that it is specifically designed for non-critical floating point operations such as computer graphics. As such the described compiler/decompiler can perform optimizations that are not allowed in other applications. For example, current general purpose compilers/decompilers do not perform optimizations because the optimizations can cause errors when handling floating point numbers (e.g. due to rounding errors). This is the case for applications that require a high degree of accuracy, but this strict requirement is not necessary for many computer graphics applications.

In example embodiments, methods for optimizing computer code is disclosed. A block of mixed intermediate representation (MIR) code is received. A partially-decompiled block of computer code is generated from the MIR code. For each instruction in the block of MIR code, in reverse order, a native expression vector for the instruction is computed. A set of pattern-matching operations is repeated until no transformations occur. A fully-decompiled block of computer code is generated from the partially-decompiled block of computer code, the fully-decompiled block of computer code having a semantic level that is raised. The fully-decompiled block of computer code is provided for deployment on an architecture, the deployment including lowering the semantic of the computer code to a level that corresponds to a CPU or GPU supported by the architecture.

The present disclosure includes apparatuses which perform these methods, including data processing systems which perform these methods and computer readable media which when executed on data processing systems cause the systems to perform these methods.

Figure 1:
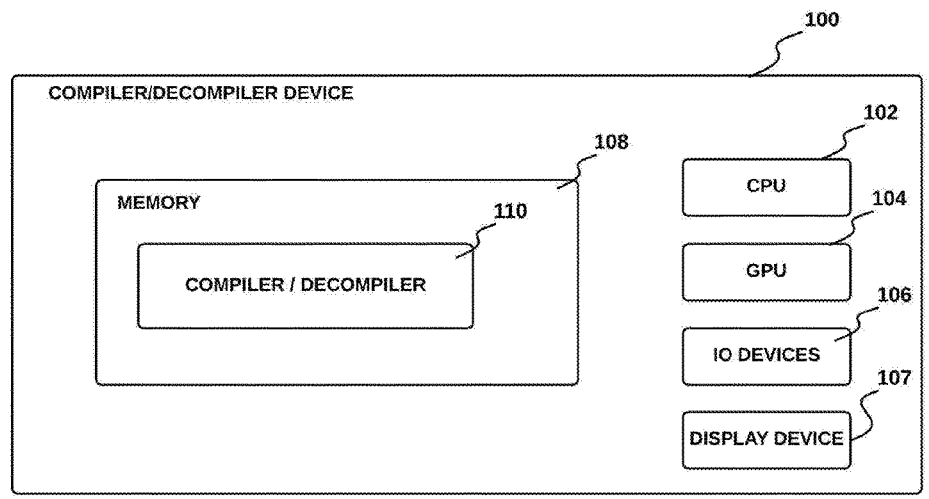
FIG. 1 a schematic illustrating a compiler/decompiler device, in accordance with one embodiment.

Turning now to the drawings, systems and methods for a compiler/decompiler system in accordance with embodiments of the disclosure are illustrated. In accordance with many embodiments, and as shown in FIG. 1, a compiler/decompiler device 100 includes a memory 108, one or more central processing units (CPUs) 102, input/output (I/O) devices 106, and potentially a graphical processing unit (GPU) 104. The CPU 102 is any type of processor, processor assembly comprising multiple processing elements (not shown), having access to a memory 108 to retrieve instructions stored thereon, and execute such instructions. Upon execution of such instructions, the instructions implement the compiler/decompiler device 100 to perform a series of tasks as described herein. The memory 108 can be any type of memory device, such as random access memory, read only or rewritable memory, internal processor caches, and the like. In some embodiments, the compiler/decompiler device 100 is a mobile computing device, such as a smartphone, tablet computer and head mounted display (HMD) such as virtual reality HMDs, augmented reality HMDs and mixed reality HMDs, and the like. In some embodiments, the compiler/decompiler device 100 is a desktop computer or game console.

The input/output devices 106 include, for example, a keyboard or keypad, mouse, pointing device, and touch-screen. The compiler/decompiler device 100 further includes one or more display devices 107, such as a computer monitor, a touchscreen, and a head mounted display, which may be configured to display digital content including video, a video game environment, and integrated development environment and a virtual simulation environment to a user. The display device 107 is driven or controlled by the one or more GPUs 104 and optionally the CPU 102. The GPU 104 processes aspects of graphical output that assists in speeding up rendering of output through the display device 107.

In accordance with an embodiment, the memory 108 in the compiler/decompiler device 100 can be configured to store a compiler/decompiler module 110 that communicates with the display device 107 and also with other hardware such as the I/O device(s) 106 to present a compiler/decompiler application to a user. The compiler/decompiler module 110 includes computer-executable instructions residing in the memory 108 that are executed by the CPU 102 and optionally with the GPU 104 during operation in order to create a runtime application program such as a compiler/decompiler application. The compiler/decompiler module includes three stages: a front end which includes language importers that generates an intermediate representation (IR) from a source code input program; a middle end which includes a decompiler module that performs generic IR optimizations to raise the semantic level of computations, including symbolic simplifications; and a back end that includes a compiler module and exporters that handle IR lowering to particular platforms (e.g., including specific CPU architectures). The compiler module output includes control flow graphs (CFGs) and high-level optimizations as described herein.

In the compiler/decompiler described herein, mathematical functions (e.g., including square root, sine, cosine, rounding functions, and the like) are functions implemented within the compiler (e.g., not external library function calls) so that the compiler evaluates a result for a function at compile-time using a desired accuracy. The desired accuracy can be determined at compile time (e.g., chosen by a user).

Figure 2:
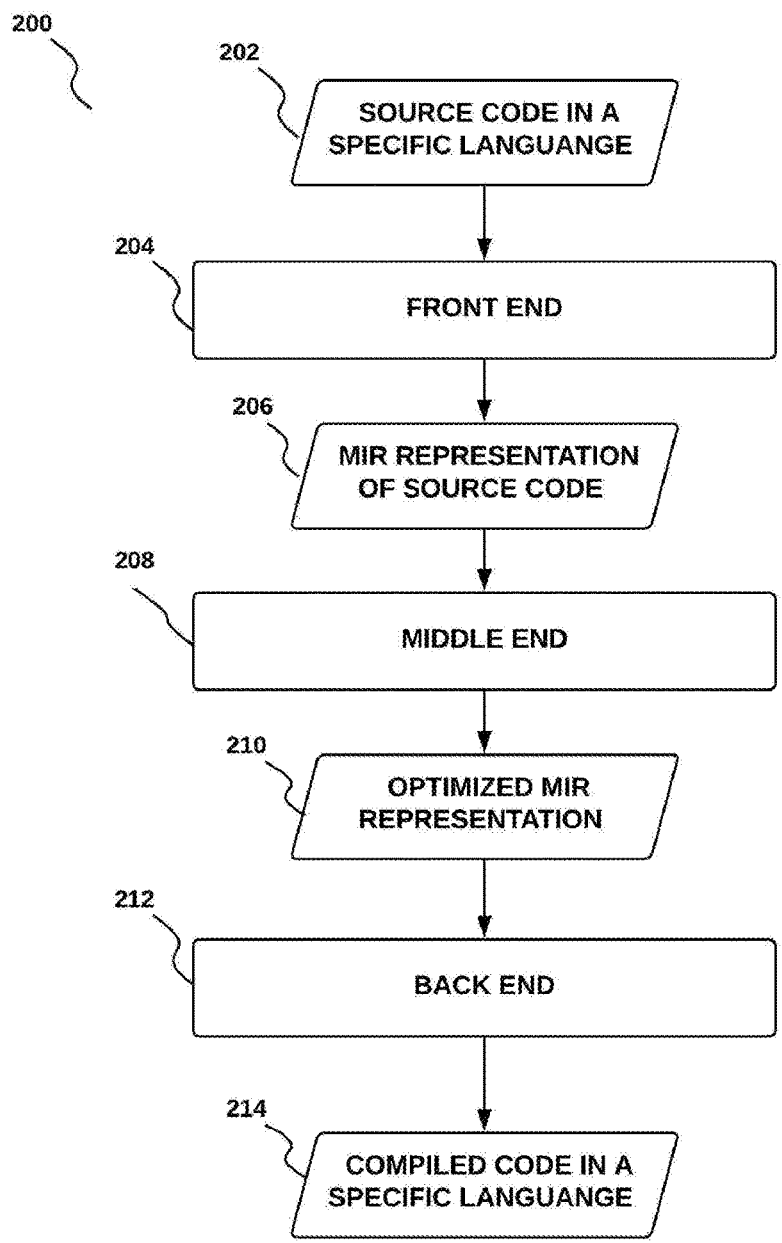
FIG. 2 is a flowchart illustrating a compiler/decompiler method, in accordance with one embodiment.

In accordance with an embodiment and shown in FIG. 2 is the basic flowchart 200 of the compiling of a source code program 202. The front end 204 converts the source code 202 into an IR representation 206. Then a decompiler module in the middle end 208 modifies the IR representation with generic optimizations to raise the semantic level of the IR representation. A back end 212 then takes the optimized IR representation 210 and performs target specific (e.g., CPU specific) optimizations to output compiled code 214 in a specified language.

The compiler/decompiler 110 is highly compact and extremely fast since the compiler/decompiler itself is highly vectorized. In accordance with an embodiment, the compiler/decompiler provides vector calculation of a function for a vector argument of the function (e.g., parallel calculation on each element of a vector) using SIMD auto vectorization for all mathematical functions. In order for the vector calculation to be scalable for a function (e.g. fast no matter how many components in a vector argument), the compiler/decompiler performs a test to ensure that the function does not use any branching. If the test fails (e.g., if the function has a branch), then the compiler/decompiler computes each component serially instead of in parallel. Existing compilers compute components in serial instead of in parallel; for example, when computing the cosine of a vector, existing compilers store the vector into memory, and the scalar cosine function is called for each component, after which the vector is reloaded into a vector register, which is a slow process that can make vector code slower than scalar code in many situations.

In accordance with an embodiment, the specific IR (e.g., both the optimized IR 210 and the non-optimized IR 206) used within the compiler/decompiler 110 is a data structure based on two approaches to constructing an intermediate representation: instruction sequences and directed graphs. The first approach represents code as a sequence of instructions, which is always needed within a compiler because instruction sequences are the final form of a compiled program; however, performing optimizations is difficult and limited when operating on instruction sequences. The second approach is to represent code as a grouping of directed graphs. The directed graph representation makes optimization easier but can result in slow compilation. Most compilers need to go from one representation (e.g., the directed graph representation) to the other (e.g., instruction sequence representation) between optimization phases which considerably slows down compilation and raises memory consumption. The compiler/decompiler system described herein avoids the slow compilation and high memory use since it does not transform the IR code from one representation to another but rather creates a single data structure for IR that combines the two formats. In accordance with an embodiment, the front end 204 and the middle end 208 create an IR format (referred to herein as mixed IR or MIR) that builds on static single assignment (SSA). The MIR supports both instruction sequence and directed graph representations in a compact manner in part so the IR code can be quickly traversed and transformed in both representations. MIR is SSA augmented with metadata that includes a hashmap and assignment information that is used to express variable assignment. To create MIR, the front end simulates multiple assignments for named variables. Each basic block has a hash-map that stores the last definition of every named variable. The hash-map is used to resolve variables and to compute the PHI nodes required by SSA. After a program is built (and optimized), the MIR allows the compiler/decompiler to target an SSA based compiler (e.g., LLVM), or target text-based languages that expect named variables (e.g., C or HLSL).

In accordance with an embodiment, the back end 212 queries the CPU instruction set (e.g., the instruction set architecture or ISA) for specific instruction support for a particular function (e.g., different equivalent ways of implementing the function), and analyzes the response to select the best available function implementation to produce the fastest possible compiled code.

Optimization:

The decompiler module within the middle end 208 optimizes code by removing inefficiencies and redundancies. For example, it is possible for a mathematical function to be compiled in a way that makes it computationally inefficient when it is implemented. This could be due to the use of older compilation techniques. It is also possible that compiled code becomes inefficient due to function calls with specific arguments where the outcome is known and the act of performing the computation is wasteful (e.g., multiplying by 1 or by zero).

In accordance with an embodiment, within the decompiler module in the middle end 208 lies an idiom pattern matching method which includes a pattern matching library that serves as a special repository of known computational shortcuts for the method. The pattern matching method detects mathematical patterns within the initial source code and relates those patterns back to one or more code functions or commands. The pattern matching method works with low level math functions and high level math identities and theorems. For example, the pattern matching method can use Lagrange's identity to change one set of operations dot(a, a)*dot(b, b)−(dot(a, b))^2 into a simpler set of operations cross(a, b)^2 which replaces three dot products with one cross product. Using Lagrange's identity allows the decompiler module to create optimized MIR 210 with the replacement since one cross product is more computationally efficient that three dot products. The pattern matching method can also use algebraic identities such as substituting cos(a)*cos(b)−sin(a)*sin(b) with the mathematically equivalent and computationally more efficient cos(a+b).

The decompiler uses a recursive method for determining function patterns. On each pass of the recursion, the decompiler recognizes functions and optimizes the MIR based on the mathematical properties and identities of the recognized functions. Then, the decompiler recursively does more passes and finds higher levels of patterns that were not obvious in the first pass. The pattern recognition looks for larger patterns (patterns with the largest number of nodes) before looking for smaller patterns. The optimizer works on the graph representation (including sub graphs) and collapses sections of the graph to create higher representation of the code for the optimized MIR 210. The pattern matching method of the decompiler transforms groups of nodes within a graph into a shorter sequence of operations (e.g., smaller number of nodes) to compute the same output with more efficient code and more efficient computation.

In accordance with an embodiment, there is provided a set of native virtual opcodes that cover a broader range of operations than what is supported by CPUs. The pattern matching method uses the native virtual opcodes. The decompiler module in the middle end 208 recognizes idioms in the non-optimized MIR 206 and replaces the idioms with equivalent higher level native opcodes, thus raising the semantic level of the original MIR code 206. As the semantic level raises, the decompiler better understands the original intent of the author of the code and can apply mathematical properties and identities to further optimize the code. The decompiler module better understands the intent of the author when the module raises the semantic of a code pattern to a native opcode, which allows the module to use mathematical properties of that function to further optimize the MIR code (e.g. changing cos(abs(x)) to cos(x) knowing that cosine is symmetrical around zero). The mathematical identities are implemented using the pattern matching method, which relies on high-level native opcodes. Function calls are replaced with high level native opcodes which allows the decompiler module to use mathematical identities (e.g., in the decompiler module the cosine function is not an external function, but rather a native opcode wherein the mathematical behaviour is known.

In accordance with an embodiment, each instruction within the decompiler module and compiler module includes a native opcode label (e.g., describing what it does, like ADD for addition, SUB for subtraction, MUL for multiplication, etc.) and a list of operands. An operand is a pointer to a source (e.g., which can be either another instruction or a constant value), a swizzle (a vector describing how the components of the source should be permuted) and a negation field (boolean). All operands can be swizzled and negated, eliminating the need for explicit SWIZZLE and NEG instructions within the compiler/decompiler. Throughout the description herein, an instruction is referred to as "insn", and a native opcode for an instruction is shown with the notation "insn→op", and operand pointers for an instruction are shown with the notation "insn→src[0 . . . n].ptr" for up to 'n' operand pointers ("ptr" is a pointer that points to the source instruction for each operand), and operand swizzles for an instruction are shown with the notation "insn→src[0 . . . n].swizzle" for up to 'n' operand swizzles, and operand negation for an instruction is shown with the notation "insn→src[0 . . . n].neg" for up to 'n' operand negations. For example, "insn→src[0].ptr" is a pointer to the first operand in insn, and "insn→src[0].ptr→src[0].ptr" is a pointer that points to the first operand of the first operand of insn. For example in the following ADD(MUL(X, X), Y)), the root instruction 'insn' is the addition instruction 'ADD', the first operand is a multiplication MUL(X,X), and the first operand of the first operand is the value 'X'. The dependency graph is constructed by following the pointers.

The pattern matching method uses a 128 bit vector referred to herein as a native expression vector in order to encode instructions. A 128 bit native expression vector consists of twelve 10 bit source fields and an 8 bit opcode field. The 10 bit source field includes 8 bits for the opcode (of which 1 is reversed to allow the use of '-' and '~' in expressions), 1 bit for negation and 1 bit for leaf matching (e.g., VAR). During operation, a bit vector is computed on demand from an instruction opcode and associated operands. An expression can represent three levels of operations from a single root instruction "insn", for instructions with 3 operands. The following is an example of a subtree encoding of instruction "insn" into an expression. The 128 bit vector will hold:

insn→op
{insn→src[0].ptr→op, insn→src[0].neg}
{insn→src[1].ptr→op, insn→src[1].neg}
{insn→src[2].ptr→op, insn→src[2].neg}
{insn→src[0].ptr→src[0].ptr→op, insn→src[0].ptr→src[0].neg}
{insn→src[0].ptr→src[1].ptr→op, insn→src[0].ptr→src[1].neg}
{insn→src[0].ptr→src[2].ptr→op, insn→src[0].ptr→src[2].neg}
{insn→src[1].ptr→src[0].ptr→op, insn→src[1].ptr→src[0].neg}
{insn→src[1].ptr→src[1].ptr→op, insn→src[1].ptr→src[1].neg}
{insn→src[1].ptr→src[2].ptr→op, insn→src[1].ptr→src[2].neg}
{insn→src[2].ptr→src[0].ptr→op, insn→src[2].ptr→src[0].neg}
{insn→src[2].ptr→src[1].ptr→op, insn→src[2].ptr→src[1].neg}
{insn→src[2].ptr→src[2].ptr→op, insn→src[2].ptr→src[2].neg}

In accordance with an embodiment, swizzles are ignored by the pattern matching method, and extra fields are ignored for instructions with less than 3 operands (e.g., absolute value instruction ABS(X) only has one operand, and the addition instruction ADD(A,B) only has two operands), and the source fields also have extra bits that tell if the source has only one user, and if this source appears several times in the subtree. In accordance with an embodiment, opcodes can include special values for constants and other kind of source such as parameters. The decompiler module and compiler module can represent several kinds of source using native expression vectors, among others: any source (SRC), variables (VAR), constants (CONST) (e.g., including ZERO, ONE, TWO, HALF, VAL (homogeneous vector)), unary operations (UNOP) (e.g., including NOT, ABS, LOG, EXP, SQRT, SIN, COS, TAN, etc.), binary operations (BINOP) (e.g., including ADD, SUB, MUL, DIV, MIN, MAX, CMPEQ, etc.), and ternary operations (TERNOP) (e.g., including: MAD, SELECT, LERP, etc.).

In accordance with an embodiment, during operation the pattern matching method looks for matches between expressions such that ZERO matches ZERO, but also matches VAL, CONST and SRC. The same is true for all the other constants. Similarly, for unary operations, the opcode NOT matches UNOP and SRC. The same is true for all other unary operations. Similarly for binary operations, the opcode ADD matches BINOP and SRC. The same is true for all other binary operations. Similarly for the ternary operation MAD, which matches TERNOP and SRC. The same is true for all other ternary operations.

In accordance with an embodiment, the bit patterns for sources are chosen to efficiently classify instructions by using simple bitwise operations. To match an expression with a pattern, the decompiler module (or compiler module) verifies that some bits of the expression vectors are the same as the ones in the reference pattern. This is achieved by bitwise ANDing the expression vector with a mask (e.g., to select the desired bits), and compare the result with the reference value. For example, on an Intel architecture, this can be done with three SIMD instructions, making the pattern matching extremely fast (e.g., thousands of patterns can be matched without impacting compiler performance). The three SIMD instructions include one instruction for clearing the bits to be ignored, one instruction to compare all bits with the reference value, and one instruction to gather all the bits together. Matching an expression with a pattern matches the instruction opcode for the expression, the three direct operands (e.g., 3 operand children) and the three operands of each of the three direct operands (e.g., 9 operand grandchildren) in parallel.

Figure 3:
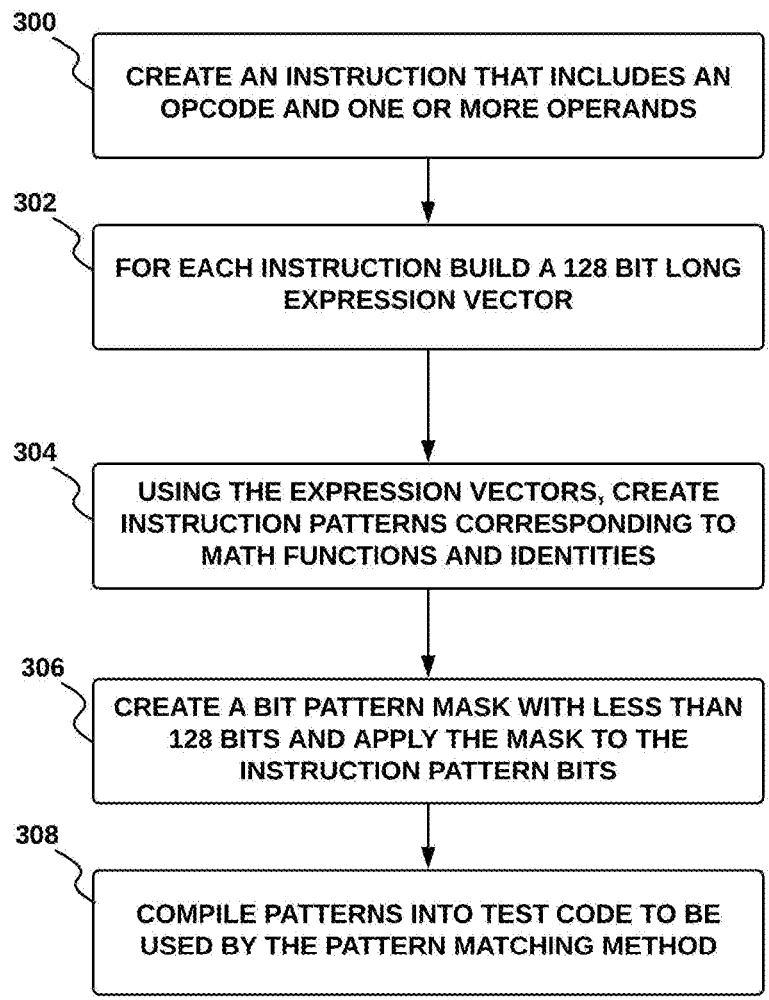
FIG. 3 is a flowchart illustrating a method for creating patterns, in accordance with one embodiment.

In accordance with an embodiment and shown in FIG. 3 there is provided a method for adding patterns (e.g., mathematical patterns, mathematical identity patterns, and the like) and computing the mask for the pattern. At process 300, an instruction is created that includes an opcode and one or more operands. At process 302, for each instruction, a 128 bit long expression vector is built. At process 304, using one or more expression vectors, an instruction pattern is created that corresponds to a math function or identity. At process 306, a mask with less than 128 bits is computed and applied to the instruction pattern. At process 308, the result of process 306 is compiled into test code to be used by the pattern matching method. Patterns are written using the opcode names with modifiers, and can be nested, e.g.: ADD(SRC, CONST) provides a pattern mask for matching any instruction that adds any source (SRC) with a constant (CONST). As another example, ADD(SRC, -SRC) provides a pattern mask for matching any instruction that adds any source (SRC) with the negated value of any other source (-SRC). As another example, ADD(MUL(SRC, TWO), SRC) provides a pattern mask for matching any instruction that adds the product of any source times two to any other source. As another example, COS(ABS(~SRC)) provides a pattern mask for matching any instruction that computes the cosine of the absolute value of any source that is never referred to by another instruction. As another example, MUL(VAR, VAR) provides a pattern mask for matching any instruction that multiplies any variable with itself.

In accordance with an embodiment patterns can be created with the native expression vectors to perform complex code transformations, for example performing mathematical simplifications using identities. As an simple example, the pattern for ADD(SRC, -SRC) can be used to match any code within the MIR that adds a negative value and replaces it with a subtraction (e.g., replace 'a+(-b)' with 'a-b'). As another simple example, the pattern for COS(ABS(SRC)) can be used to match any code within the MIR that takes the cosine of an absolute value and replaces it with the cosine of the value (e.g., replace 'cos(|a|)' with cos(a). Any number of complicated identities can be built up with native expression vectors and any number of complicated patterns can be used to fuse multiple instructions into a single instruction that will fuse multiple instruction into one.

In accordance with an embodiment, the same native expression vector can match multiple patterns. For example an instruction that adds a value and one will match: ADD(SRC, ONE), ADD(SRC, VAL), ADD(SRC, CONST), ADD(SRC, SRC). This avoids a combinatorial explosion of patterns that must be checked during the pattern matching method, and each code transformation builds on one or more previous transformations recursively. During the pattern matching method, on each recursive pass the instructions are simplified, replaced or fused, and the semantic level of the program is raised and more and more patterns are likely to match. The process repeats until no more transformation can be applied. Let's consider the following example:

```
float a = ...;          // SRC
float b = -0.;          // -ZERO
float c = a & ~b;       // AND(SRC, NOT(-ZERO))
float d = a * a;        // MUL(VAR, VAR)
float e = sqrt(d);      // SQRT(MUL(VAR, VAR))
float f = c + e;        // ADD(AND(VAR, NOT(-ZERO)),
                        //     SQRT(MUL(VAR, VAR)))
``` after the following transformation if(test(AND(SRC, NOT(SRC))))  {/* a & ~b→andn(a, b)*/} the series of instructions are reduced to

```
float a = ...;          // SRC
float b = -0.;          // -ZERO
float c = andn(a, b);   // ANDN(SRC, -ZERO)
float d = a * a;        // MUL(VAR, VAR)
float e = sqrt(d);      // SQRT(MUL(VAR, VAR))
float f = c + e;        // ADD(ANDN(VAR, -ZERO),
                        //     SQRT(MUL(VAR, VAR)))
``` after the following transformation if(test(ANDN(SRC, -ZERO)))    {/* andn(a, -0.) -> abs(a) */} the series of instructions are reduced to

```
float a = ...;          // SRC
float c = abs(a);       // ABS(SRC)
float d = a * a;        // MUL(VAR, VAR)
float e = sqrt(d);      // SQRT(MUL(VAR, VAR))
float f = c + e;        // ADD(ABS(VAR), SQRT(MUL(VAR, VAR)))
``` after the following transformation if(test(SQRT(MUL(VAR, VAR)))){/* sqrt(a*a)→abs(a) */} the series of instructions are reduced to

```
float a = ...;          // SRC
float c = abs(a);       // ABS(SRC)
float e = abs(a);       // ABS(SRC)
float f = c + e;        // ADD(ABS(VAR), ABS(VAR))
``` after common subexpression elimination the series of instructions are reduced to:

```
float a = ...;          // SRC
float c = abs(a);       // ABS(SRC)
float f = c + c;        // ADD(ABS(VAR), ABS(VAR))
``` after the following transformation if(test(ADD(VAR, VAR)))       {/* a + a -> 2*a */} the series of instructions are reduced to

```
float a = ...;          // SRC
float c = abs(a);       // ABS(SRC)
float f = 2*c;          // MUL(ABS(SRC), TWO)
```

After the pattern matching method, the complex expression for "f" becomes 2*abs(a), even if no absolute value instruction (ABS) appeared in the source code 202.

Figure 4:
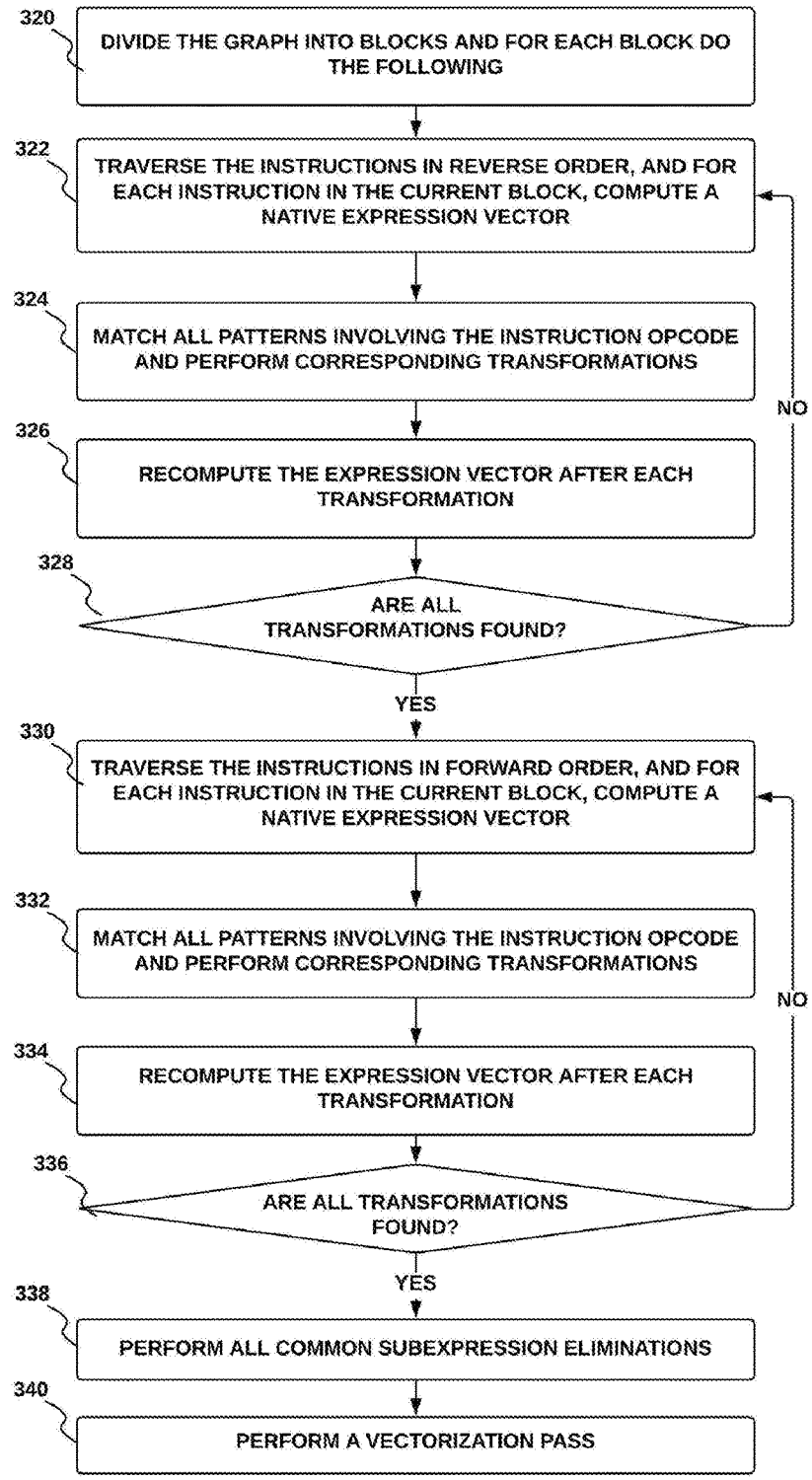
FIG. 4 is a flowchart illustrating a pattern matching method within a compiler/decompiler, in accordance with one embodiment.

In accordance with an embodiment and shown in FIG. 4 is a pattern matching method. The pattern matching method is as follows: At process 320, the MIR graph is divided into blocks. Then, at process 322 for each instruction in the current block, in reverse order of the instructions: a) Compute a native expression vector for a current instruction and b) Repeat the following until no transformations occur: at process 324, match all patterns involving the instruction opcode and perform corresponding transformations, and at process 326 recompute expression vector after each transformation. At process 328 test that all transformations have been found. Based on all transformations being found, then at process 330, for each instruction in the current block, in order of the instructions: a) Compute an expression vector for current instruction, and b) Repeat the following until no transformations occur: at process 332, match all patterns involving the instruction opcode and perform corresponding transformations, at process 334, recompute the expression vector after each transformation, at process 336, based on all transformations being found, perform all common subexpression elimination, and at process 340 run a vectorization pass, b5) If no transformation has occurred, stop.

Once the program is decompiled and its semantic is raised, it can be deployed on any architecture and its semantic is then lowered back to the desired CPU or GPU. While doing so, the program can be compiled back to any desired accuracy, thus allowing to trade accuracy for performance. It's possible to decompile a highly accurate program and compile it back to a less accurate but more efficient program. The opposite is also true, one could decompile a fast but inaccurate program and compile it back to a more accurate, but slower, one. In some embodiments, there is provided a method for precision control with trigonometric functions such that the precision of the mathematical functions in the compiled output can be decided at compile time (e.g., low, medium, and high precision). As the optimal implementation of a given high level operation can differ considerably from one architecture to another, the decompilation phase allows the recovery of the high-level representation of a program that was optimized for a given architecture, while the compilation phase can retarget this optimized code to another architecture. So the whole compiler/decompiler can to be used to transform (or 'port') a program written for one architecture into an optimized program for a different architecture.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 5:
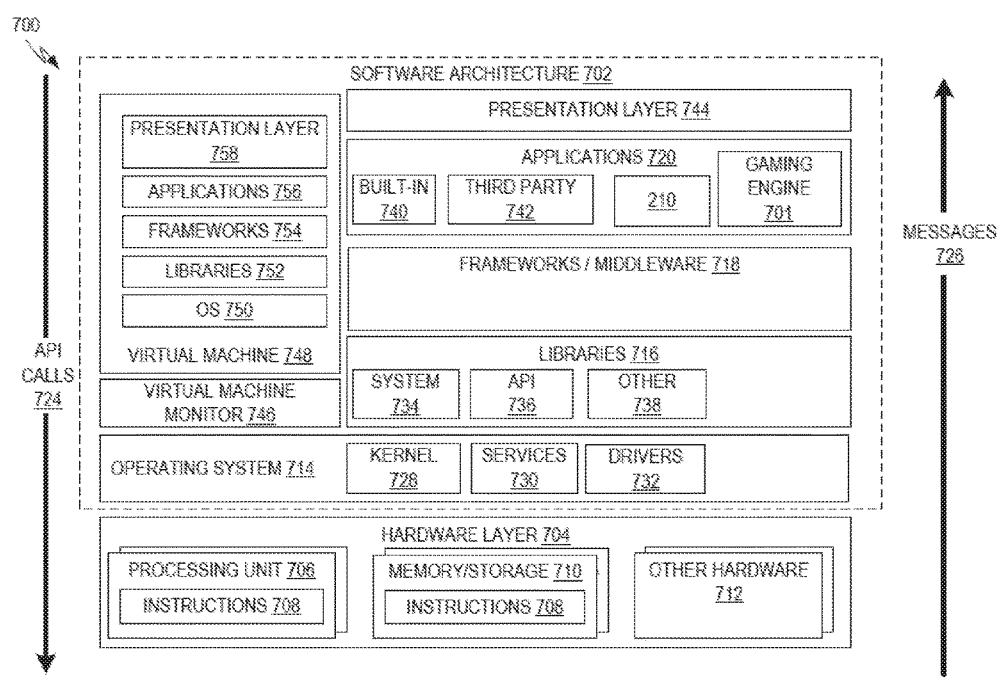
FIG. 5 is a block diagram illustrating an example software architecture, which may be used in conjunction with various hardware architectures described herein.

FIG. 5 is a block diagram 700 illustrating an example software architecture 702, which may be used in conjunction with various hardware architectures herein described to provide a gaming engine 701 and/or components of the compiler/decompiler system 200. FIG. 5 is a non-limiting example of a software architecture and it will be appreciated that many other architectures may be implemented to facilitate the functionality described herein. The software architecture 702 may execute on hardware such as a machine 800 of FIG. 6 that includes, among other things, processors 810, memory 830, and input/output (I/O) components 850. A representative hardware layer 704 is illustrated and can represent, for example, the machine 800 of FIG. 6. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 5, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 5, this is illustrated by a virtual machine 748. The virtual machine 748 creates a software environment where applications/modules can execute as if they were executing on a hardware machine (such as the machine 800 of FIG. 6, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 6:
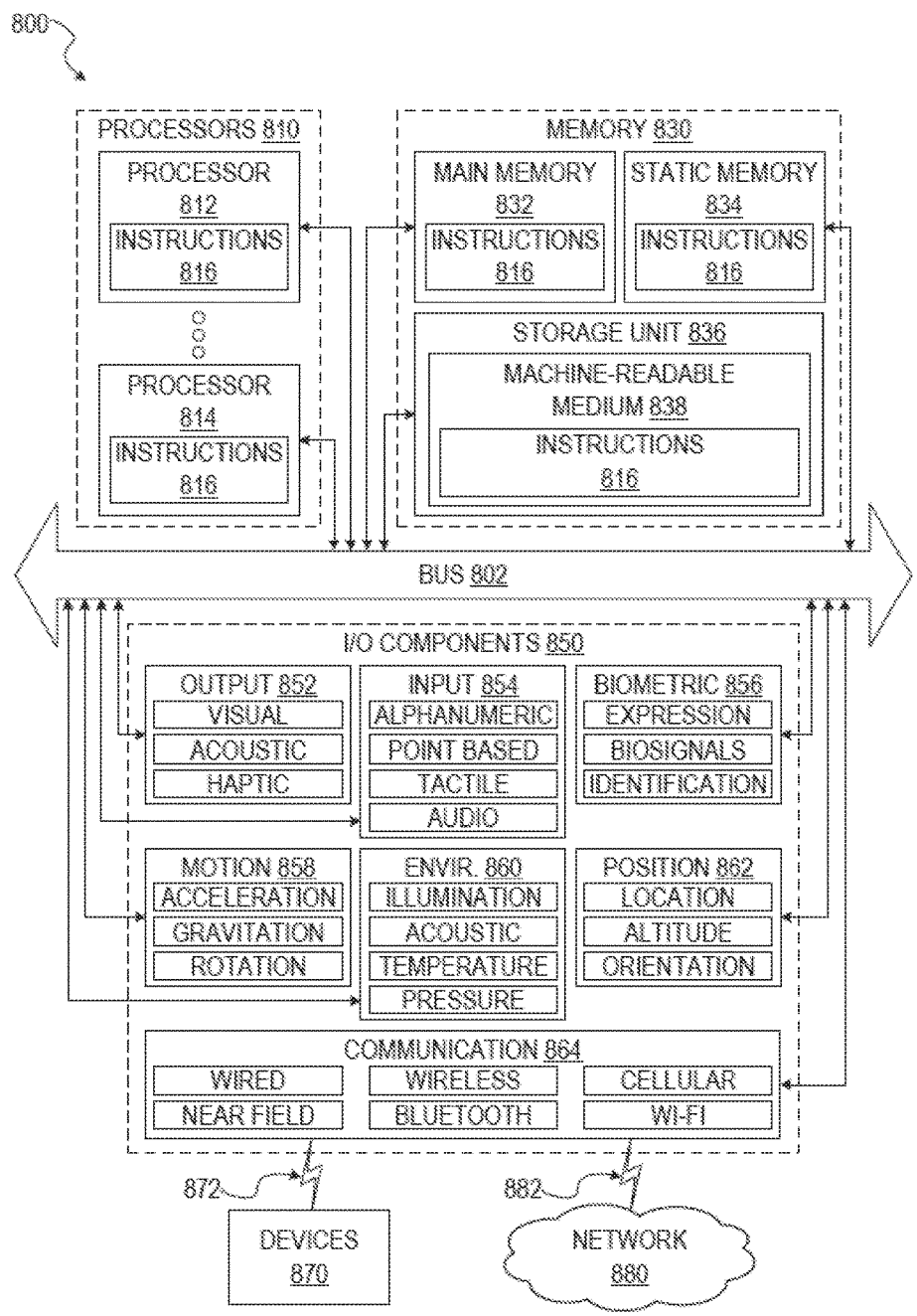
FIG. 6 is a block diagram illustrating components of a machine, according to some example embodiments, configured to read instructions from a machine-readable medium (e.g., a machine-readable storage medium) and perform any one or more of the methodologies discussed herein.

FIG. 6 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 110 is similar to the HMD 102. Specifically, FIG. 6 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 6 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 6. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising:
   one or more computer processors;
   one or more computer memories;
   one or more instructions incorporated into the computer memories, the one or more instructions configuring the one or more computer processors to perform operations for optimizing computer code, the operations comprising:
   receiving a block of mixed intermediate representation (MIR) code;
   for each instruction in the block of MIR code, in reverse order, generating a partially-decompiled block of computer code, the generating of the partially-decompiled block of computer code including computing a native expression vector for the instruction and repeating a set of pattern-matching operations until no transformations occur, the set of pattern-matching operations including matching all patterns involving the instruction in the block of MIR code, performing transformations based on the matching of all of the patterns in the block of the MIR code recomputing the expression vector after each of the transformations,
   for each instruction in the partially-decompiled block of MIR code, in order, computing an additional native expression vector for the instruction in the partially-decompiled block of MIR code and performing an additional set of pattern-matching operations until no additional transformations occur, the additional set of pattern-matching operations including matching all additional patterns involving the instruction in the partially-decompiled block of computer code, and recomputing the expression vector after each of the additional transformations;
   generating a fully-decompiled block of computer code from the generated partially-decompiled block of computer code, the fully-decompiled block of computer code having a semantic level that is raised; and
   providing the fully-decompiled block of computer code for deployment on an architecture, the deployment including lowering the semantic of the computer code to a level that corresponds to a central processing unit (CPU) or graphical processing unit (GPU) supported by the architecture.

2. The system of claim 1, wherein the MIR code is created by creating static single assignment form for a computer source code, simulating multiple assignments for named variables within the computer source code, creating a hash-map and populating the hash-map with the last definition of every named variable.

3. The system of claim 2, wherein the generating of the fully-decompiled block of computer code further includes, based on no transformations occurring, running a common subexpression elimination pass.

4. The system of claim 2, wherein the generating of the fully-decompiled block of computer code further includes, based on no transformations occurring, running a vectorization pass.

5. The system of claim 1, wherein the expression vector includes a set of bits for source fields and an additional set of bits for an opcode and wherein the matching of all patterns involving the instruction in the block of MIR code is performed on the bits corresponding to the expression vector.

6. The system of claim 1, wherein the semantic level corresponds to a higher native semantic level in which function calls are replaced with high-level native opcodes.

7. The system of claim 6, wherein the high-level native opcodes allow use of mathematical identities to optimize the generating of the fully-decompiled block.

8. A computer-implemented method comprising:
performing operations for optimizing computer code, the operations comprising:
receiving a block of mixed intermediate representation (MIR) code;
for each instruction in the block of MIR code, in reverse order, generating a partially-decompiled block of computer code, the generating of the partially-decompiled block of computer code including computing a native expression vector for the instruction and repeating a set of pattern-matching operations until no transformations occur, the set of pattern-matching operations including matching all patterns involving the instruction in the block of MIR code, performing transformations based on the matching of all of the patterns in the block of the MIR code recomputing the expression vector after each of the transformations,
for each instruction in the partially-decompiled block of MIR code, in order, computing an additional native expression vector for the instruction in the partially-decompiled block of MIR code and performing an additional set of pattern-matching operations until no additional transformations occur, the additional set of pattern-matching operations including matching all additional patterns involving the instruction in the partially-decompiled block of computer code, and recomputing the expression vector after each of the additional transformations;
generating a fully-decompiled block of computer code from the generated partially-decompiled block of computer code, the fully-decompiled block of computer code having a semantic level that is raised; and
providing the fully-decompiled block of computer code for deployment on an architecture, the deployment including lowering the semantic of the computer code to a level that corresponds to a central processing unit (CPU) or graphical processing unit (GPU) supported by the architecture.

9. The computer-implemented method of claim 8, wherein the MIR code is created by creating static single assignment form for a computer source code, simulating multiple assignments for named variables within the computer source code, creating a hash-map, and populating the hash-map with the last definition of every named variable.

10. The computer-implemented method of claim 8, wherein the generating of the fully-decompiled block of computer code further includes, based on no transformations occurring, running a common subexpression elimination pass.

11. The computer-implemented method of claim 8, wherein the generating of the fully-decompiled block of computer code further includes, based on no transformations occurring, running a vectorization pass.

12. The computer-implemented method of claim 8, wherein the expression vector includes a set of bits for source fields and an additional set of bits for an opcode and wherein the matching of all patterns involving the instruction in the block of MIR code is performed on the bits corresponding to the expression vector.

13. The computer-implemented method of claim 8, wherein the semantic level corresponds to a higher native semantic level in which function calls are replaced with high-level native opcodes.

14. The computer-implemented method of claim 13, wherein the high-level native opcodes allow use of mathematical identities to optimize the generating of the fully-decompiled block.

15. A non-transitory computer-readable medium comprising a set of instructions, the set of instructions causing one or more computer processors to perform operations for optimizing computer code, the operations comprising:
receiving a block of mixed intermediate representation (MIR) code;
for each instruction in the block of MIR code, in reverse order, generating a partially-decompiled block of computer code, the generating of the partially-decompiled block of computer code including computing a native expression vector for the instruction and repeating a set of pattern-matching operations until no transformations occur, the set of pattern-matching operations including matching all patterns involving the instruction in the block of MIR code, performing transformations based on the matching of all of the patterns in the block of the MIR code recomputing the expression vector after each of the transformations,
for each instruction in the partially-decompiled block of MIR code, in order, computing an additional native expression vector for the instruction in the partially-decompiled block of MIR code and performing an additional set of pattern-matching operations until no additional transformations occur, the additional set of pattern-matching operations including matching all additional patterns involving the instruction in the partially-decompiled block of computer code, and recomputing the expression vector after each of the additional transformations;
generating a fully-decompiled block of computer code from the generated partially-decompiled block of computer code, the fully-decompiled block of computer code having a semantic level that is raised; and
providing the fully-decompiled block of computer code for deployment on an architecture, the deployment including lowering the semantic of the computer code to a level that corresponds to a central processing unit (CPU) or graphical processing unit (GPU) supported by the architecture.

16. The non-transitory computer-readable medium of claim 15, wherein the MIR code is created by creating static single assignment form for a computer source code, simulating multiple assignments for named variables within the computer source code, creating a hash-map, and populating the hash-map with the last definition of every named variable.

17. The non-transitory computer-readable medium of claim 15, wherein the generating of the fully-decompiled block of computer code further includes, based on no transformations occurring, running a common subexpression elimination pass.

18. The non-transitory computer-readable medium of claim 15, wherein the generating of the fully-decompiled block of computer code further includes, based on no transformations occurring, running a vectorization pass.

19. The non-transitory computer-readable medium of claim 15, wherein the expression vector includes a set of bits for source fields and an additional set of bits for an opcode and wherein the matching of all patterns involving the instruction in the block of MIR code is performed on the bits corresponding to the expression vector.

20. The non-transitory computer-readable medium of claim 15, wherein the semantic level corresponds to a higher native semantic level in which function calls are replaced with high-level native opcodes.

\* \* \* \* \*